United States Patent [19]

Lynch

[11] 3,928,867

[45] Dec. 23, 1975

[54] TELEVISION RECEIVER WITH PICTURE LEVEL CONTROL

[75] Inventor: Edward I. Lynch, Portsmouth, Va.

[73] Assignee: General Electric Company, Portsmouth, Va.

[22] Filed: May 10, 1974

[21] Appl. No.: 468,953

[52] U.S. Cl. .............................. 358/39; 178/7.5 DC

[51] Int. Cl.$^2$ ........................ H04N 5/14; H04N 5/44

[58] Field of Search .................. 358/27, 34, 64, 74; 178/7.3 DC, 7.5 DC

[56] References Cited

UNITED STATES PATENTS

| | | | |
|---|---|---|---|
| 3,622,696 | 11/1971 | Macintyre, Jr. | 178/7.5 DC |
| 3,735,029 | 5/1973 | Sunstein | 358/74 |
| 3,813,686 | 5/1974 | Mierzwinski | 178/7.5 DC |
| 3,814,852 | 6/1974 | Mierzwinski | 178/7.5 DC |

*Primary Examiner*—Richard Murray
*Assistant Examiner*—Aristotelis M. Psitos

[57] ABSTRACT

Method and apparatus for optimum adjustment of a television picture at all ambient light levels and power supply loading conditions with a minimum of manual adjustments. A light-responsive element is provided to control the gain of luminance and chrominance amplifiers in proportioned ratio and for adjusting electrical black level to correspond to optical black level. Power supply sensing is provided to reduce picture drive to prevent overload conditions while maintaining black level constant. Additional picture sensing reduces drive current on scenes of high average brightness under low ambient light conditions.

15 Claims, 3 Drawing Figures

TELEVISION RECEIVER WITH PICTURE LEVEL CONTROL

BACKGROUND OF THE INVENTION

This invention relates to controls for television receivers and more particularly to an improved method and apparatus for video picture control.

Television receivers are generally provided with controls which allow the viewer to adjust the picture to what is subjectively pleasing. Preferably, the picture of a television receiver is adjustable by a user so that it can represent the full range of video signals being received, i.e., the minimum signal level being reproduced can correspond to the blackest signal being transmitted and the maximum signal level being reproduced can correspond to the whitest signal being transmitted. In such a picture a black object would appear black and white object would appear white. A picture having the optimum desirable characteristics can be very nearly achieved in a room having low ambient lighting. However, in a room with high ambient lighting, the black level reproduction is limited by the amount of light being reflected from the face of the picture tube, i.e., even though beam current in the picture tube has been reduced to zero so that the phosphors on the tube face are not excited, the room lighting creates a reflection from the tube face which makes black objects appear to be gray.

In order to compensate for washout or loss of contrast ratio between the picture as adjusted under low ambient lighting conditions and the same picture under high ambient lighting, the video signal supplied to the picture tube can be adjusted to provide a larger amplitude drive current to give whiter whites while black level drive current is either maintained at its previous setting or adjusted upward, i.e., adjusted toward white in some ratio proportional to the increase in peak amplitude drive current. The desired effect by either method is to increase the contrast ratio. The advantage of proportionally increasing black level drive with increased video drive is to maintain electrical black in correspondence with optical black to prevent loss of low level video detail.

If the light reflection coefficient of the picture tube is such that no ambient light is reflected by the face plate, the ideal is realized and the adjustment of the picture would be as follows. The electrical black, namely the blackest black being transmitted over a number of scenes would merely be adjusted to correspond to optical black, namely the adjustment of the black so that it appears just black and not gray. This adjustment to have electrical black appear just black would have to be made only once since the tube would not reflect light and optical black would not appear to change with ambient lighting. Accordingly, with such an ideal tube, ambient lighting changes would require only a change in video drive and not black level. This need to adjust black level along with video drive to compensate for the less than perfect picture tube and different picture tube types forms a necessary element of the present invention.

Generally, the adjustment to compensate for room ambient lighting is provided by a "contrast" control and a "brightness" control. The contrast control is actually a "video drive" control since its effect is to adjust the gain of a video amplifier which causes an adjustment in the peak-to-peak amplitude of the video signal or drive current to be supplied to the picture tube. The brightness control would better be called a "bias" control since its effect is to adjust the pivot point about which the video signal swings. In earlier receivers the brightness control was used to set the average cathode current in the picture tube; however, more recently the concept of constant black level has been developed and the brightness control is used to set the minimum cathode current in the picture tube. When the brightness control is used in this latter manner, the control biases the picture tube such that the received signal corresponding to black i.e., an electrical black signal, is effective to reduce cathode current in the picture tube to zero. In a room of low ambient light this will result in reproducing as black the blackest object in the scene being received. Defining optical black as the blackest object which a viewer is capable of perceiving on the face of the picture tube under a given set of ambient lighting conditions, it can be seen that for a room of low ambient light with negligible reflection from the face of the tube, electrical black will correspond to optical black.

As the room ambient light increases, more light is reflected from the face of the picture tube with the result that optical black shifts upward into the gray area and no longer corresponds to electrical black. If electrical black is maintained constant, e.g., at zero cathode current, those luminance or color shades between optical black and electrical black are not distinguishable and other low luminance signals are not reproduced correctly. In such high ambient lighting conditions, the highlight whites in the reproduced picture become subdued and the average viewer will usually increase the video drive by adjusting the contrast and chroma controls. Although this will result in a more pleasing picture, in receivers using constant black level stabilization low luminance detail or color shades between optical black and electrical black will still not be distinguishable and low brightness colors will be reproduced incorrectly. For example, low saturation colors will be indistinguishable. Under this condition the picture should be adjusted to make electrical black correspond to optical black. In receivers of the prior art this black level adjustment could be made by means of the brightness control. Since the brightness adjustment shifts the entire video scale upward, the contrast and chroma gain ratio may then require adjustment to obtain a better picture.

When the picture tube is operated in high ambient lighting conditions and the video drive has been turned up to compensate for washout, it is likely that the high voltage power supply which supplies accelerating potential to the picture tube will become overloaded on bright scenes. To prevent this potential problem, some receivers are provided with a feedback loop which responds either to power supply voltage or to picture tube cathode current to reduce either the brightness or the video drive. In such prior art receivers, the power supply overload feedback loop does protect the power supply; however, protection is often achieved at the expense of proper black level, i.e., the black level setting is moved. In other receivers, the black level setting is maintained but only by sacrificing the DC component in the drive voltage to the picture tube, such that scene brightness in the reproduced image no longer corresponds to transmitted scene brightness.

In addition to the foregoing consideration, in color reproduction, the ratio of the amplitude of the chrominance or color signal to the amplitude of the luminance signal must be maintained. Thus, if brightness or contrast ratio is adjusted without adjusting chrominance, the reproduced picture can appear either under or over saturated. It is noted, therefore, that in typical prior art color television receivers, a multitude of adjustments may be necessary in order for the viewer to compensate for ambient light and/or picture changes.

Accordingly, it is an object of the present invention to provide an improved video control circuit in a television receiver which maintains electrical black level at optical black level regardless of ambient lighting to overcome the loss of low level information.

It is another object of the present invention to provide an improved video control circuit in a television receiver which maintains electrical black level at optical black level even under power supply overload prevention conditions.

It is a further object to provide an improved video control circuit which maintains electric black level constant under constant ambient lighting level during power supply overload prevention conditions.

It is a further object to provide a video control circuit for a television receiver in which picture drive is modified in proportion to scene duty cycle.

It is still another object of the present invention to provide an improved video control circuit in a color television receiver which adjusts electrical black level as a function of optical black level while the chrominance signal level is adjusted in proportion to the luminance signal.

SUMMARY OF THE INVENTION

In accordance with the present invention, a picture control circuit provides a control voltage to a luminance amplifier and to a chrominance amplifier to control the gain of each in a predetermined ratio. A black level preference control is also provided to adjust the electrical black level of the receiver according to the observed optical black level. In addition, a portion of the picture control voltage is combined with the previously set black level control voltage to maintain electrical black level tracking of optical black level with picture control adjustment. A high voltage power supply overload preventing circuit provides a feedback voltage to adjust the gain of both the luminance amplifier and the chrominance amplifier in response to impending overload conditions. However, the high voltage power supply overload prevention circuit is arranged in a manner to provide adjustment for the gain of the luminance and chrominance amplifiers without shifting the black level setting.

In a further embodiment, an automatic scene brightness circuit is provided to adjust luminance and chrominance gain as a function of scene brightness in order to prevent excessive picture drive under low ambient lighting conditions. The automatic scene brightness circuit prevents black level shift as the luminance and chrominance gain are adjusted by this circuit. In both of the above-noted embodiments the picture control circuit may utilize a light-responsive element to control picture drive as a function of ambient light.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in connection with the accompanying drawings in which:

DETAILED DESCRIPTION OF THE PREFERRED EMBODIMENT

Figure 1:
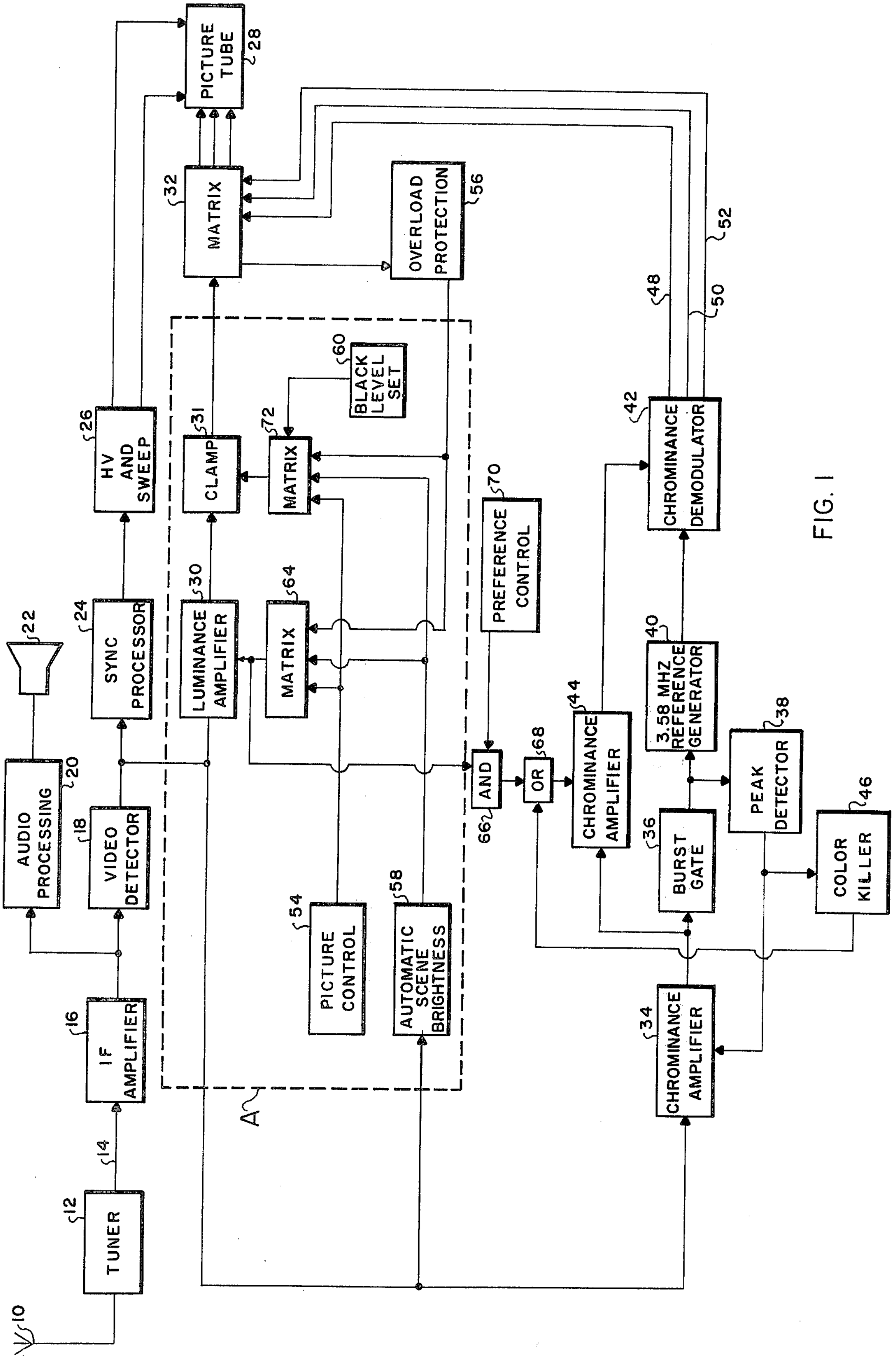
FIG. 1 is a functional block diagram of selected portions of a color television receiver showing the inventive control circuits.

Referring now to FIG. 1, there is shown a block diagram of a color television receiver with some conventional elements omitted and with elements necessary to an understanding of the present invention interconnected therein. An antenna 10 is connected to receive a television signal and to supply the received signal to a tuner 12. Tuner 12 may be of a type well known in the art including means for selecting a particular frequency channel and for supplying the signal present in the selected channel to an RF amplifier and then to a mixer so as to provide on output lead 14 the selected channel signal at a fixed IF frequency. An IF amplifier 16 is connected to receive and amplify the signal on lead 14 and to supply the amplified IF signal to a video detector 18 and an audio processing circuit 20. Audio processing circuit 20 is of a type well known in the art for extracting from the composite television signal an audio signal portion and for amplifying the audio signal for driving a speaker 22. Video detector 18 is of a type well known in the art for extracting from the composite television signal the video and synchronizing components.

A sync processor 24 is connected to receive the output signals from video detector 18 and is responsive to the sync pulses contained therein to synchronize the high voltage power supply and sweep generating circuit 26. Power supply and sweep generator 26 produces both sweep voltages, which are supplied to the deflection windings for the picture tube 28, and also supplies the high voltage accelerating potential for picture tube 28.

The output of video detector 18 is also connected into an input terminal of a luminance amplifier 30, which amplifier provides appropriate attenuation of the chrominance information in the video signal and amplifies the luminance for application to a matrix circuit 32 through a clamping circuit 31. The video signal from detector 18 is also supplied to a chrominance amplifier 34, which amplifier includes a bandpass filter which rejects frequency components outside the chrominance signal frequency spectrum. Chrominance amplifier 34 is part of an automatic color control circuit comprising a burst gate amplifier 36 and a peak detector 38. Burst gate 36 is supplied with appropriate sync signals such that the burst gate is enabled during receipt of a color burst signal whereby the color burst signal is supplied as an output signal to peak detector 38. Peak detector 38 determines the peak-to-peak amplitude of the burst signal and supplies an output signal which is directed into a gain control terminal of chrominance amplifier 34 to control the gain of amplifier 34 to maintain the level of the chrominance signal constant. Burst gate 36 also supplies the color burst signal to reference generator 40 to assure that the output signal from generator 40 is at the proper reference frequency to provide demodulation of the chrominance signal in chrominance demodulator 42. The chrominance signal is supplied to chrominance demodulator 42 from chrominance amplifier 34 by means of a second chrominance amplifier 44. A color killer circuit 46 is connected to monitor the output signal from peak detector 38 and to provide a signal to chrominance amplifier 44 to disable amplifier 44 when the color burst signal drops below a predetermined level.

The color signals derived from the video signal by chrominance demodulator 42 are conveyed via leads 48, 50 and 52 to matrix circuit 32. The matrix circuit operates in a manner well known in the art to combine the luminance signal with each of the color signals to provide drive signals to picture tube 28. If desired, matrix circuit 32 could be incorporated in picture tube 28 by providing the luminance signal to one set of control electrodes in the picture tube, and supplying the color signals to a second set of control electrodes in the picture tube.

In accordance with the present invention, a picture control 54 is provided to control the amplitude of the luminance signal and the chrominance signals applied to picture tube 28 by controlling the gain of luminance amplifier 30 and chrominance amplifier 44. Picture control 54 may be adjusted manually or automatically in response to ambient lighting conditions. The gains of luminance amplifier 30 and chrominance amplifier 44 are additionally adjusted by a high voltage protection circuit 56 in order to prevent overload of high voltage power supply 26 during high average brightness scenes. A further control of the luminance amplifier and chrominance amplifier is provided by an automatic scene brightness circuit 58 which is connected to monitor the video signal and modify picture drive in inverse relationship to the received scene duty cycle even though the high voltage power supply may not be in an overload condition. Automatic scene brightness circuit 58 and overload protection circuit 56 are shown as two separate entities since in some receivers it may be desirable to provide a different degree of control of luminance and chrominance drive in low ambient lighting as compared to high ambient lighting. It is to be noted that either circuit may be used to control luminance and chrominance drive over the full range of ambient lighting conditions encountered by proportioning the voltage output of either circuit accordingly. Consequently, the use of either circuit singly or in conjunction with the other of such circuits is within the teachings of the invention.

High voltage protection circuit 56 is connected to monitor the drive current being applied to picture tube 28 by matrix 32. Alternately, protection circuit 56 may be arranged and adapted to directly monitor the output voltage of power supply and sweep circuit 26 in a manner well known in the art. Protection circuit 56 includes a threshold circuit whereby the output signal from circuit 56 provides adjustment to modify picture drive when picture tube cathode current exceeds a predetermined level. To control the gain of amplifier 30 and amplifier 44, the signals from picture control 54, high voltage protection circuit 56 and automatic scene brightness circuit 58 are combined in a matrix circuit 64 in a predetermined ratio and the output signal from matrix circuit 64 is provided to a gain control input terminal of luminance amplifier 30 and through AND gate 66 and OR gate 68 to a gain control input terminal of chrominance amplifier 44. The AND circuit 66 is provided in order that a preference control 70 may be included to provide a viewer control for adjusting the saturation level of the color signal in accordance with viewer preference. OR gate 68 is included to allow a simplified manner of combining the gain control signal and the color killer signal from color killer circuit 46. The output signals from picture control 54, high voltage protection circuit 56, and automatic scene brightness circuit 58 are also applied to a second matrix circuit 72 in proportioned ratio in order to control the black level of the luminance signal applied to matrix 32. In the embodiment shown in FIG. 1 wherein the television receiver uses AC coupling, the output signal from matrix 72 is applied to a control clamping circuit 31, which clamping circuit may be, for example, a sync tip clamp of a type well known in the art.

Figure 2:
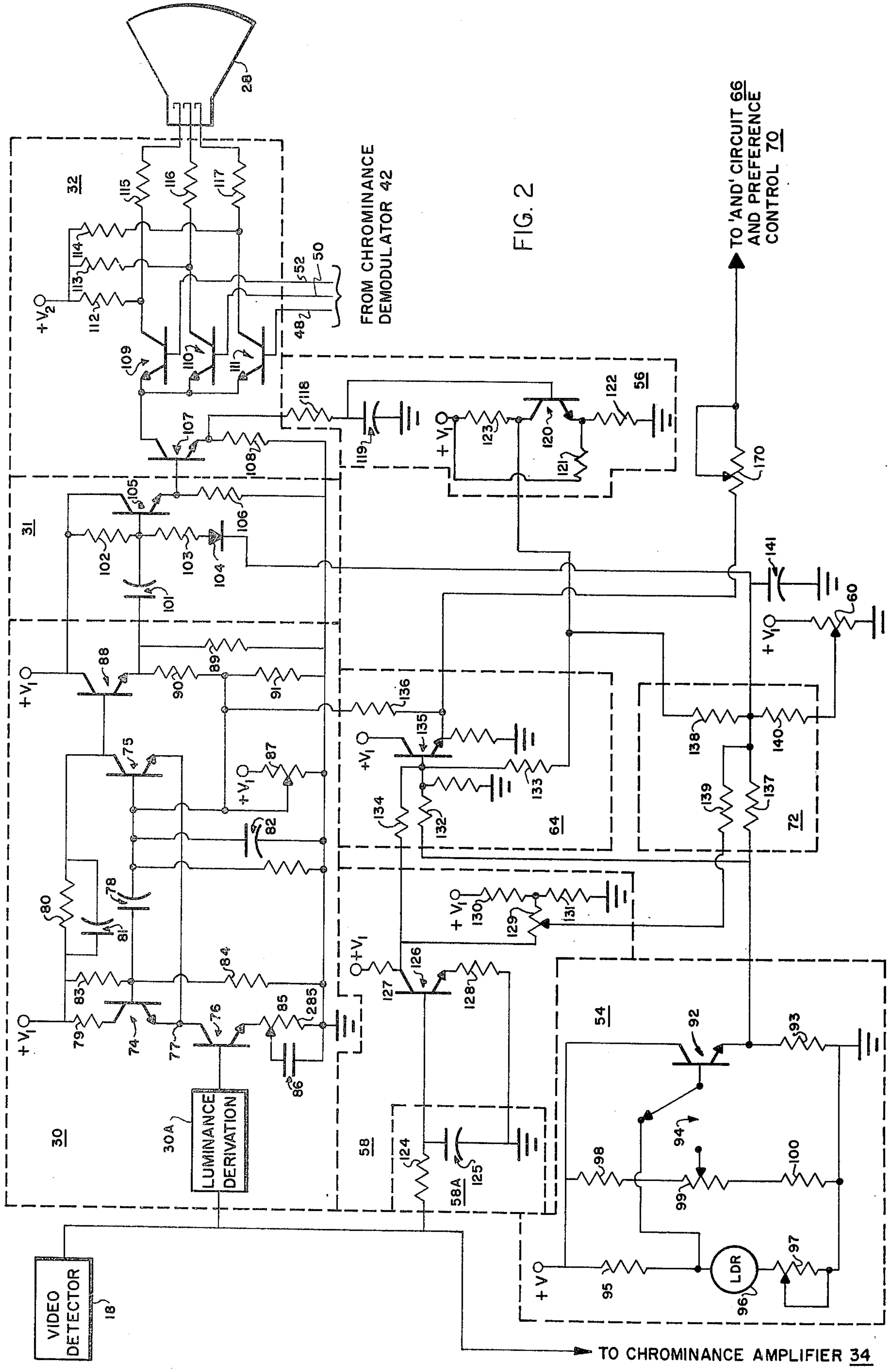
FIG. 2 is a schematic representation of one form of the present invention embodied in the block diagram of FIG. 1.

In operation of the invention as shown in FIG. 1, the video signal from video detector 18 is applied to luminance amplifier 30 which amplifier includes luminance derivation circuitry 30A (as shown in FIG. 2) and a variable gain controlled amplifier stage. The luminance derivation circuitry 30A includes chroma trapping attenuation circuits which pass the luminance portion of the video signal to the variable gain controlled amplifier stage. The amplified luminance signal is connected through clamping circuit 31 and matrix 32 to picture tube 28. Black level set 60 is adjusted to cause the electrical black level of the luminance signal to correspond to a desired minimum signal level, which is preferably the optical black level of the reproduced scene at the picture tube, which optical black level is a function of ambient lighting and the reflection coefficient of the picture tube face. Proper adjustment of black level is accomplished by observing the reproduced picture over a number of scenes and adjusting black level set 60 to make the darkest object appear black. The picture control 54 adjusts the gain of the luminance amplifier 30 to control the peak amplitude of the luminance signal and provide proper contrast ratio for the reproduced scene in relationship to the ambient lighting conditions. Preference control 70 may then be adjusted to modify the gain of chrominance amplifier 44 in order to set the saturation level of the color signals to provide pleasing color reproduction in proportion to the previously adjusted black level and contrast ratio.

With the receiver thus preset, the picture control may then be adjusted either manually or automatically to compensate for ambient light changes and will maintain correspondence between contrast ratio and chrominance saturation level while simultaneously providing tracking between electrical black and optical black.

In the embodiment wherein the picture control 54 is responsive to ambient lighting conditions to automatically adjust the contrast ratio and black level setting, any changes in ambient lighting will be automatically compensated. Matrix 64 proportions the picture control output voltage to adjust the gain of luminance amplifier 30 and chrominance amplifier 44 to provide increased contrast ratio and color saturation as ambient lighting level increases in order to prevent washout of the reproduced picture. Likewise, as the ambient lighting level decreases, picture control 54 proportionately reduces the contrast ratio and color saturation level to prevent the reproduced scenes from being excessively bright and appearing over saturated in the reduced lighting conditions. At the same time that the contrast ratio and color saturation levels are being adjusted, picture control 54 also supplies a signal through matrix 72 in order to modify the previously set black level so that electrical black level will be caused to track optical black level with changes in ambient lighting.

If ambient lighting conditions are low and contrast ratio and color saturation levels have been reduced accordingly, scenes of high average brightness may be considered overly bright by some viewers against the relatively dark ambient lighting. This becomes increasingly apparent if the percentage of DC coupling of the luminance signal is high. Automatic scene brightness circuit 58 therefore provides a signal through matrix 64 to modify the luminance and chrominance drive and thus to reduce contrast ratio and color saturation when scenes of high average brightness are being received. The amount of automatic scene brightness correction provided will be controlled by matrix 64 and will be proportioned according to the percentage DC restoration or DC coupling provided in the luminance channel. Automatic scene brightness circuit 58 also applies a signal through matrix 72 to clamping circuit 31; however, this signal is proportioned by matrix 72 to maintain the black level setting, rather than to shift the black level setting.

Under conditions of high ambient lighting, the picture control 54 will increase picture drive and, if the high voltage power supply in circuit 26 is incapable of responding to the increased current demands, picture degradation can occur. Accordingly, overload protection circuit 56 monitors the drive current for picture tube 28 and supplies a signal to matrix 64 to restrict picture drive, i.e., luminance and chrominance, when the drive current exceeds a predetermined level. Additionally, as with the signal from brightness circuit 58, the signal from overload protection circuit 56 is directed into matrix 72, which matrix controls clamping circuit 31, so that the black level setting is maintained constant with picture drive changes occasioned by overload protection circuit 56.

As can therefore be seen, once a desired ratio of luminance to chrominance has been set, any changes in picture drive occasioned by picture control 54, automatic scene brightness circuit 58, or overload protection circuit 56 are applied to luminance amplifier 30 and chrominance amplifier 44 in proportioned ratio through matrix 64 such that the desired luminance to chrominance ratio is maintained. Furthermore, the signals from picture control 54, brightness circuit 58 and overload protection circuit 56 are applied to clamping circuit 31 through matrix 72 in such a manner that only changes in picture control 54 are effective to shift black level setting and therefore electrical black level is caused to track optical black level.

The embodiment described thus far with reference to FIG. 1 illustrates a receiver using AC coupling or partial DC coupling of the luminance signal to picture tube 28. In a receiver using complete DC coupling, that portion of the diagram shown within dotted line A may be replaced by the diagram to be described below with reference to FIG. 3.

Referring now to FIG. 2, there is shown a schematic representation of the inventive circuit embodied in the block diagrams of FIG. 1. The video signal developed at the output of video detector 18 is applied to luminance amplifier 30 which amplifier comprises a first section indicated in a general block form as a luminance derivation circuit 30A for deriving from the composite video signal a luminance signal. The luminance signal is applied to a variable gain controlled differential amplifier of a type well known in the art comprising a pair of transistors 74 and 75 and a driver transistor 76. The emitters of transistor 74 and 75 are connected together at a common junction 77 to which is also connected the collector terminal of transistor 76. The bases of transistors 74 and 75 are connected together through a coupling capacitor 78. Load resistors 79 and 80 connect the collectors of transistor 74 and 75 respectively to the voltage source $V_1$. A capacitor 81 which shunts resistor 80 is provided to adjust the high frequency roll-off of the amplifier. A capacitor 82 connected between the base of transistor 75 and ground eliminates stray pick-up from the control voltage and also provides some system stability. Bias voltage for transistor 74 is provided by a resistive voltage divider network comprising resistors 83 and 84 connected between voltage $V_1$ and ground with the base of transistor 74 connected to the junction mediate the two resistors. The emitter of driver transistor 76 is connected to ground through a potentiometer 85 which potentiometer has a variable arm connected to ground through capacitor 86. Potentiometer 85 may be utilized as a sharpness control. A potentiometer 87 provides a voltage to the base of transistor 75 for centering the gain of the amplifier.

The output of the differential amplifier is taken from the collector of transistor 75 and is applied to the base terminal of a transistor 88 which transistor is connected in an emitter follower configuration. The output of transistor 18 is developed across a resistor 89 connected between the emitter of transistor 88 and ground and also across a pair of resistors 90 and 91 serially connected between the emitter of transistor 88 and ground. The junction mediate the resistors 90 and 91 is connected to the base terminal of transistor 75 whereby a feedback voltage is developed to cause the combination of the transistor 75 and transistor 88 to operate as an operational amplifier circuit and make the operation of the differential amplifier insensitive to the variation in the parameters of transistors 74 and 75. Amplifier 30, as thus described, is an AC signal amplifier, the gain of which is controlled by a DC control signal. Such DC signal is applied to the base of transistor 75 by resistor 136, as will be described below.

The amplified luminance signal developed at the emitter of transistor 88 is applied to clamping circuit 31 which, as shown in FIG. 2, may comprise a sync tip clamp of a type well known in the art including a capacitor 101, a pair of resistors 102 and 103, and a diode 104. Resistors 102 and 103 are serially connected between a voltage source $V_1$ and the anode of diode 104. The capacitor 101 is connected between the emitter of transistor 88 and the junction mediate resistors 102 and 103. The cathode of diode 104 is connected to a reference voltage which in the present invention is developed at the output of matrix circuit 72. As is well known, the sync tip clamp operates to clamp the tip of the sync pulse in the received video signal to the reference voltage developed at the cathode of diode 104.

The luminance signal developed at the output of the DC restorer, that is, at the junction mediate resistors 102 and 103, is connected by an emitter follower transistor 105 to matrix circuit 32. Matrix circuit 32 comprises a driver transistor 107 having its base terminal connected to the emitter of transistor 105 and its emitter terminal connected to ground through a bias resistor 108. The collector of transistor 107 is connected to the emitters of transistors 109, 110 and 111. The bases of transistors of 109, 110 and 111 are connected to receive the demodulated chrominance signals from chrominance demodulator 42 and thus serve to matrix the luminance and chrominance signals for application to picture tube 28. Bias voltages for transistors 109, 110 and 111 are supplied respectively from voltage source $V_2$ through resistors 112, 113 and 114. Video drive signals are applied respectively to the cathodes of picture tube 28 from the collectors of transistors 109, 110 and 111 through resistors 115, 116 and 117.

Picture control circuit 54 comprises an emitter follower transistor 92 having its collector connected to a source of voltage $V_1$ and its emitter connected to ground through a bias resistor 93. The base of transistor 92 is connected to a switch 94 whereby a voltage derived from a first voltage divider network comprising a resistor 95, a light dependent resistor 96 and a potentiometer 97, may be selected; or alternatively, a voltage derived from a second voltage divider network comprising a resistor 98, a potentiometer 99 and a resistor 100 may be selected. Automatic control of the voltage developed by picture control 54 is obtained when the voltage output is derived from the first voltage divider network since this network includes a light dependent resistor 96 whose resistance is a function of impinging ambient light. The second voltage divider network provides manual control of the picture level by virtue of the viewer's ability to adjust potentiometer 99 thereby changing the voltage at the base of transistor 92.

The voltage developed at the emitter of transistor 92 is applied through matrix 64 to the base of transistor 75 in luminance amplifier 30 to modify the gain of the differential amplifier to adjust the luminance level. The voltage from the emitter of transistor 92 is also applied via matrix 64, through potentiometer 170 and AND circuit 66 to chrominance amplifier 44 to adjust the color saturation level. Potentiometer 170 is a chroma-luminance ratio tracking adjustment to insure tracking linearity. The output of this potentiometer is applied to AND circuit 66. Also connected to AND circuit 66 is customer preference control 70 which adjusts the ratio of color saturation to contrast ratio. The output of picture control 54 is also applied to matrix circuit 72 and thence to the cathode of diode 104 in clamp 31 for controlling the black level of the signal being applied to picture tube 28.

It can be seen that a current proportional to the total cathode current applied to picture tube 28 is returned to ground through transistor 107 and its associated emitter resistor 108. Therefore, the voltage developed at the emitter of transistor 107 across resistor 108 is directly proportional to the total cathode current. This voltage is therefore utilized as an input signal to overload protection circuit 56 to derive a signal to prevent power supply overload on scenes of excessive brightness. As is shown, overload protection circuit 56 comprises an integrator consisting of a resistor 118 and a capacitor 119 which provides an output signal proportional to total cathode current, or average scene brightness, and a transistor 120 connected to receive the signal from the integrator and supply the signal to matrix circuit 64 and matrix circuit 72. Transistor 120 includes a threshold function derived by means of a voltage divider network comprising resistors 121 and 122 connected between voltage source $V_1$ and ground, the emitter of transistor 120 being connected to the junction mediate the two resistors. A load resistor 123 is connected between voltage source $V_1$ and the collector of transistor 120. The voltage developed at the collector of transistor 120 will remain fixed until the voltage developed across capacitor 119 and applied to the base terminal of transistor 120 exceeds the bias voltage established at the emitter of transistor 120. Therefore, a threshold is established below which the overload protection circuit will not function to restrict picture drive.

Automatic scene brightness control 58 is similar to overload protection circuit 56 with the exception that no threshold is provided in the scene brightness circuit. Another difference between these two control circuits is the point of sensing, overload protection being responsive to the drive applied to the picture tube and controlling in closed loop fashion, whereas automatic scene brightness control 58 responds to received video level and controls in open loop fashion. The output of the video detector is connected into scene brightness circuit 58 through an integrator 58A comprising a resistor 124 and a capacitor 125. The voltage developed by integrator 58A is applied to the base terminal of a transistor 126 which transistor amplifies the integrated video signal and develops at its collector terminal a voltage to be applied to matrix circuit 64 for reducing the gain of the luminance and chrominance amplifier on scenes of high average brightness. Transistor 126 is biased by means of a collector load resistor 127 and an emitter bias resistor 128. As shown, the output signal developed at the collector of transistor 126 is also coupled through a potentiometer 129 to an input of matrix circuit 72 so as to prevent black level shift when the picture drive is reduced on scenes of high average brightness. Bias voltage for potentiometer 129 is provided by a voltage divider network comprising a pair of resistors 130 and 131 connected between voltage source $V_1$ and ground with the potentiometer connected to the junction mediate the two resistors. Potentiometer 129 enables the electrical black level to be corrected if the average scene brightness as transmitted is in error and provides improper black level.

Matrix circuit 64 comprises a plurality of resistors 132, 133 and 134 and an emitter follower output transistor 135. Each of the signals derived by control circuits 54, 56 and 58 is applied to matrix circuit 64 through respective resistors 132, 133 and 134, each of the resistors being tied to a common point at the base terminal of transistor 135. The resistors are proportioned such that the effect of each of the control signals is to produce the desired response by developing a predetermined voltage at the base of transistor 135. The voltage controlled signal developed at the emitter of transistor 135 is coupled by a resistor 136 to the base terminal of transistor 75 in the differential amplifier to control the gain of the luminance amplifier 30 and by a potentiometer 170 to AND circuit 66 and chrominance amplifier 44 to control the gain of the chrominance amplifier. Potentiometer 170 allows factory adjustment of the ratio of luminance to chrominance. It is noted that this ratio is maintained with operation of the picture control, the automatic scene brightness control, and power supply overload prevention.

Matrix circuit 72 comprises a plurality of resistors 137, 138, 139 and 140. Signals from the respective control circuits 54, 56 and 58 are applied to matrix circuit 72 by means of proportioning resistors 137, 138 and 139. Initial black level setting is provided by a voltage developed at the variable arm of potentiometer 60 and applied to matrix circuit 72 through proportioning resistor 140. Each of the resistors 137, 138, 139 and 140 is tied to a common point, which common point becomes the output terminal of the matrix circuit. The output terminal of matrix circuit 72 is connected to ground through a capacitor 141 whereby a DC voltage is developed across the capacitor for application to the cathode of diode 104 in the DC restorer to establish a black level setting.

It is to be noted that if power supply voltage for matrix circuit 32 is unregulated such that power supply shifts occur with variations in picture drive, matrixes 64 and 72 may be proportioned to compensate picture drive and black level to correct for the power supply shifts. The matrixes 64 and 72 may also be proportioned to compensate for other system errors such as, for example, picture tube grid voltages and focus voltage variations. Obviously, the more system errors to be compensated, the more critical will be the selection of the individual components comprising matrixes 64 and 72.

Figure 3:
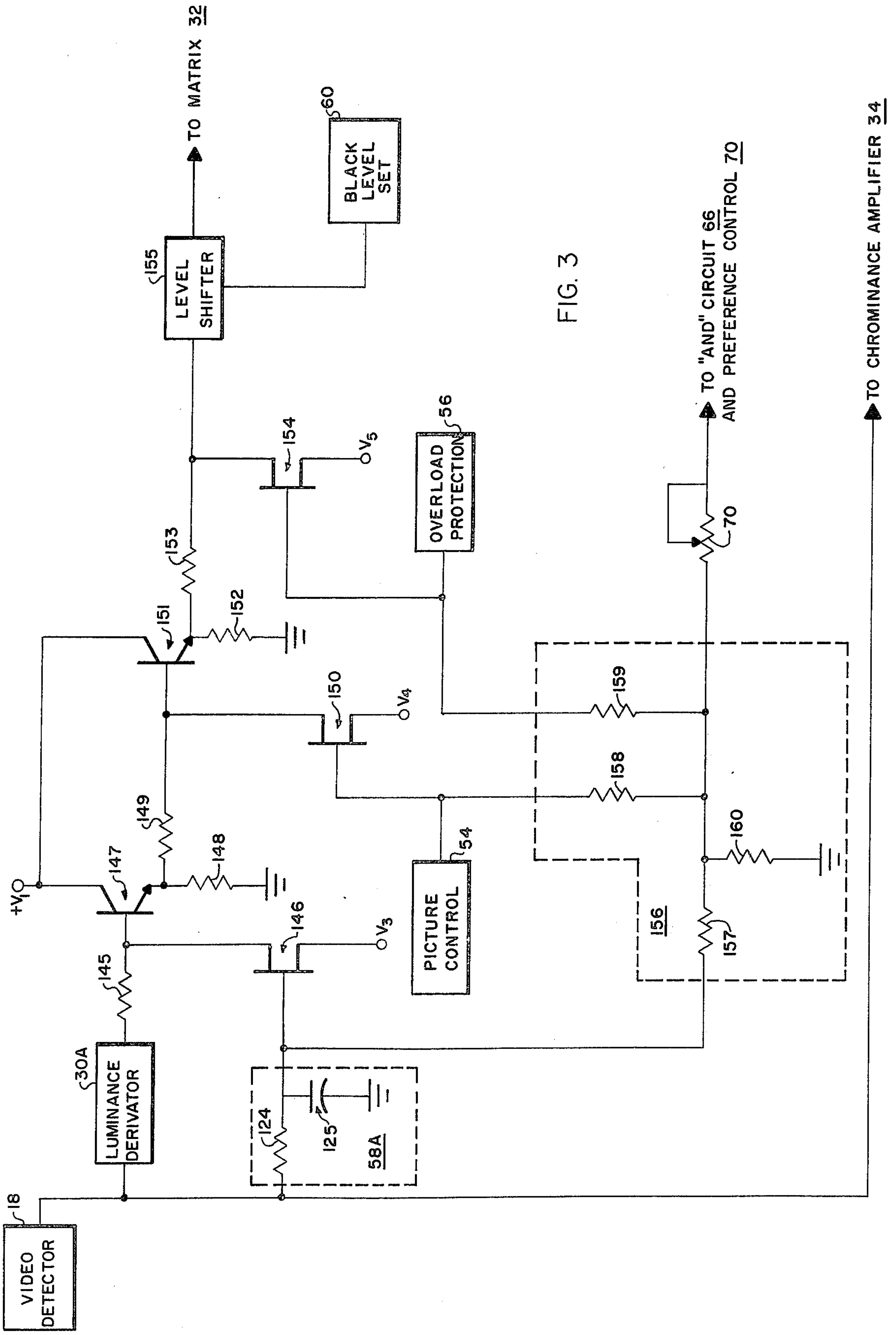
FIG. 3 ia a partial schematic and partial block diagram of the present invention as applied to a completely DC coupled receiver.

Referring now to FIG. 3 there is shown a further embodiment of the present invention for application to a televison receiver utilizing DC coupling as contrasted to the circuit shown in FIGS. 1 and 2 wherein AC coupling and DC restoration is shown. To utilize the present invention in a DC coupled receiver, that portion of the invention shown within dotted line A in FIG. 1 is replaced by the circuit of FIG. 3. This circuit provides DC coupling of the luminance signal to matrix circuit 32 while permitting variation of the amplitude of the luminance signal. In order to permit variation of the luminance signal in response to three different criteria, i.e., scene brightness, picture control setting and overload protection, the DC coupling circuit is divided into three isolated sections. Each of the sections includes a voltage divider comprising two elements, one of which is fixed and the other being variable. Isolation between the sections is provided by emitter follower amplifiers.

In the preferred embodiment the variable element in each voltage divider comprises a JFET since these elements provide the advantage of being compatible with the picture control 54 and overload protection circuit 56, i.e., the JFET is a voltage variable resistance permitting the output voltages from these control circuits to be directly utilized. However, since the JFET acts only as a variable resistance, other circuit elements could be utilized in place thereof.

The video signal from video detector 18 is directed into a luminance amplifier which includes a first circuit indicated generally as a luminance derivation circuit 30A, the output of which is the luminance signal. The luminance signal is directed into a voltage divider network comprising the serial combination of a resistor 145 and a JFET 146 with the source terminal of JFET 146 being connected to a voltage source $V_3$. As is well known, since the voltage divider network is fed from a stiff source the signal developed at the junction mediate the divider network elements will pivot around the voltage $V_3$. Variation of the resistance of the elements in the divider will thus serve to vary the amplitude of the signal at the junction without changing the DC pivot point. Voltage $V_3$ is selected to correspond to the transmitted black level i.e., electrical black level, to thereby prevent black level shift as the amplitude of the luminance signal is varied.

Automatic scene brightness control is implemented in the circuit of FIG. 3 by applying the voltage developed across capacitor 125 at the output of integrator 56A to the gate electrode of JFET 146. The voltage developed across capacitor 125 is a function of average scene brightness and serves to modify the resistance of JFET 146 to thereby control the amplitude of the luminance signal appearing at the drain electrode of JFET 146.

The drain electrode of JFET 146 is connected to a base terminal of a buffer transistor 147, which transistor is connected in an emitter follower configuration with its collector terminal connected to voltage source $V_1$ and its emitter terminal connected to ground through a resistor 148. The luminance signal developed at the emitter of transistor 147 is applied to a second voltage divider network comprising a resistor 149 and a JFET 150 with the outputted luminance signal being developed at the drain electrode of JFET 150. The source electrode of JFET 150 is connected to a source of voltage $V_4$ which, in the present embodiment, may be a voltage corresponding to sync tip whereby the luminance signal is caused to pivot around this voltage.

The picture control signal generated by picture control 54 is applied to the gate electrode of JFET 150 to control the amplitude of the luminance signal in response to picture control 54 requirements. Since at this point the luminance signal pivots around a voltage near sync tip rather than black level, the black level of the luminance signal is varied with changes in picture control 54 setting.

The luminance signal at the drain electrode of JFET 150 is directed into the base terminal of a buffer transistor 151, which transistor is connected in an emitter follower configuration with its collector electrode connected to voltage source $V_1$ and its emitter terminal connected to ground through an emitter bias resistor 152. The signal developed at the emitter of transistor 151 is directed into a third voltage divider network comprising a resistor 153 and a JFET 154. The source electrode of JFET 154 is connected to a voltage $V_5$, which voltage is selected to be at the black level of the luminance signal at the emitter of 151 whereby black level at the drain of 154 in the circuit may be maintained constant while the amplitude of the luminance signal is varied.

The luminance signal developed at the drain electrode of JFET 154 is directed into a level shifter circuit 155 of a type well known in the art, which level shifter is responsive to a control voltage from black level set 60 to adjust the black level of the luminance signal at the picture tube. Alternately, the luminance signal could be fed directly into matrix 32 rather than through level shifter 155 and final black level control could be accomplished by applying the control voltage from black level set 60 to control elements of picture tube 28 in a manner well known in the art.

In order to restrict picture drive to prevent HV power supply overload, the control voltage from overload protection circuit 56 is applied to the gate electrode of JFET 154. Thus, the embodiment of FIG. 3 shows how in a DC coupled receiver luminance amplitude is controlled as a function of average scene brightness by means of JFET 146, as a function of picture control 54 setting by means of JFET 150 and as a function of picture tube cathode current by means of overload protection circuit 56 and JFET 154.

Control of chrominance drive current is achieved by combining the signals from picture control 54, overload protection circuit 56 and average scene brightness circuit 58A in matrix circuit 156, the output from matrix circuit 156 being applied through tracking control potentiometer 170 to chrominance amplifier 44 via AND circuit 66. Matrix circuit 156 comprises a plurality of resistors 157, 158 159 and 160 connected to define a common junction for combining the various control signals in proportioned ratio.

Thus, it can be seen that the circuit of FIG. 3 provides amplitude control of the luminance and chrominance signals in a desired ratio in response to average scene brightness, picture control setting and overload protection but that black level of the luminance signal is varied only in response to picture control setting. Furthermore, since black level is used as a pivot voltage in two stages, at least one matrix circuit has been eliminated.

Although the present invention has been described in conjunction with a television receiver employing automatic color control (ACC) it will be apparent to those skilled in the art that the concept of automatic picture control to control picture drive and provide electrical black tracking of optical black can be implemented without the provision of either automatic scene brightness or HV power supply overload protection circuits or ACC. Other modifications, such as, for example, providing picture control adjustment of a common amplifier for video prior to its separation into luminance and chrominance signals are also within the teaching of the present invention.

It will thus be seen that the objects set forth above are efficiently attained by the embodiments set forth. Since changes may be made in the above described constructions without departing from the spirit and scope of the invention, it is intended that the foregoing shall be interpreted as illustrative only and that the scope of the invention be limited only by the claims appended hereto.

What is claimed as new and desired to be secured by Letters Patent of the United States is:

1. In a television receiver including a source of video signal, a picture tube and a coupling circuit for translating said video signal to said picture tube, an improved picture control system comprising:

level setting means coupled to said coupling circuit for adjusting the electrical black level of said video signal to correspond to a desired minimum signal level to be applied to said picture tube, amplitude control means coupled to said coupling circuit for adjusting the maximum amplitude of said video signal to correspond to a desired level to be applied to said picture tube, said amplitude control means being arranged to modify said minimum signal level so that electrical black level is modified in proportion to maximum signal level adjustment, signal responsive means coupled to said coupling circuit and responsive to the average video signal level for adjusting the maximum amplitude of said video signal and rendering said electrical black level insensitive to the change in maximum amplitude caused by said signal responsive means.

2. The television receiver as defined in claim 1 wherein said receiver is a color television receiver and includes luminance and chrominance amplifiers, said amplifiers being connected to supply the luminance and chrominance components of said video signal to said picture tube and said amplitude control means and said signal responsive means being connected to control the maximum amplitude of said luminance and chrominance signals in preselected proportion.

3. The television receiver as defined in claim 1 wherein said amplitude control means includes means responsive to ambient lighting conditions for changing the maximum amplitude of said video signal.

4. The television receiver as defined in claim 1 wherein said signal responsive means comprises a overload protection circuit.

5. The television receiver as defined in claim 4 wherein said overload protection circuit is responsive to video drive current applied to said picture tube and provides a feedback signal to said coupling circuit to restrict said video signal to a predetermined level.

6. The television receiver as defined in claim 5 wherein said overload protection circuit includes means for establishing a threshold level below which level said overload circuit is inoperative to restrict said maximum video level.

7. The television receiver as defined in claim 1 wherein said amplitude control means is responsive to power supply variations to adjust said video signal to maintain electrical black level in correspondence with said desired minimum signal level.

8. The television receiver as defined in claim 1 wherein said level setting means includes a sync tip clamp DC restorer for adjusting said electrical black level to correspond to said desired minimum signal level.

9. The television receiver as defined in claim 1 wherein said signal responsive means comprises a video monitoring circuit responsive to the average level of said video signal.

10. The television receiver as defined in claim 1 wherein said signal responsive means comprises:

an overload protection circuit responsive to drive current applied to said picture tube, said protection circuit including means for establishing an average drive current threshold level above which level feedback voltage is supplied to said coupling circuit to limit said video signal to a pre-determined level; and a video signal monitoring circuit responsive to the average video signal level to limit the maximum video signal level.

11. In a television receiver including a picture tube, a source of video signal and coupling means for coupling said video signal to said picture tube, an improved picture control comprising:

level setting means coupled to said coupling means for setting the electrical black level of said video signal to correspond to optical black level;

amplitude control means coupled to said coupling means for controlling the maximum video signal amplitude to be supplied to said picture tube and maintaining said electrical black level in correspondence with said optical black level in response to ambient light change.

12. In a color television receiver including a source of luminance and chrominance signals, a picture tube and luminance and chrominance signal channels for coupling said luminance and chrominance signals to said picture tube, an improved picture control system comprising:

amplitude control means for producing a first signal representative of a desired picture level on said picture tube;

scene brightness control means connected to receive said luminance and chrominance signals and responsive thereto to produce a second signal proportional to the average value of said luminance signal;

an overload protection circuit connected to monitor drive current applied to said picture tube, said protection circuit being responsive to the average value of said drive current exceeding a predetermined threshold level to produce a third signal;

a first matrix connected to receive said first, second and third signals, said first matrix being adapted to combine said first, second and third signals in a predetermined ratio to produce a gain control signal for application to said luminance and chrominance signal channels for adjusting the amplitude of said luminance and chrominance signals; and a second matrix connected to receive said first, second and third signals, said second matrix being adapted to combine said first, second and third signals in a predetermined ratio to produce a reference voltage for application to said luminance channel to set the electrical black level of said luminance signal to correspond to a desired minimum luminance signal level.

13. The color television receiver as defined in claim 12 including a level setting means connected to supply a voltage to said second matrix to establish an initial correspondence between said electrical black level and said minimum luminance signal level.

14. The color television receiver as defined in claim 13 including a preference control connected to modify said gain control signal being applied to said chrominance signal channel to establish a desired ratio of luminance to chrominance signal level.

15. The color television receiver as defined in claim 14 wherein said level setting means includes means to adjust black level to compensate for transmitted black level error.

* * * * *